Nov. 23, 1954   R. J. WOODS   2,695,144
AIRPLANE
Filed April 11, 1950
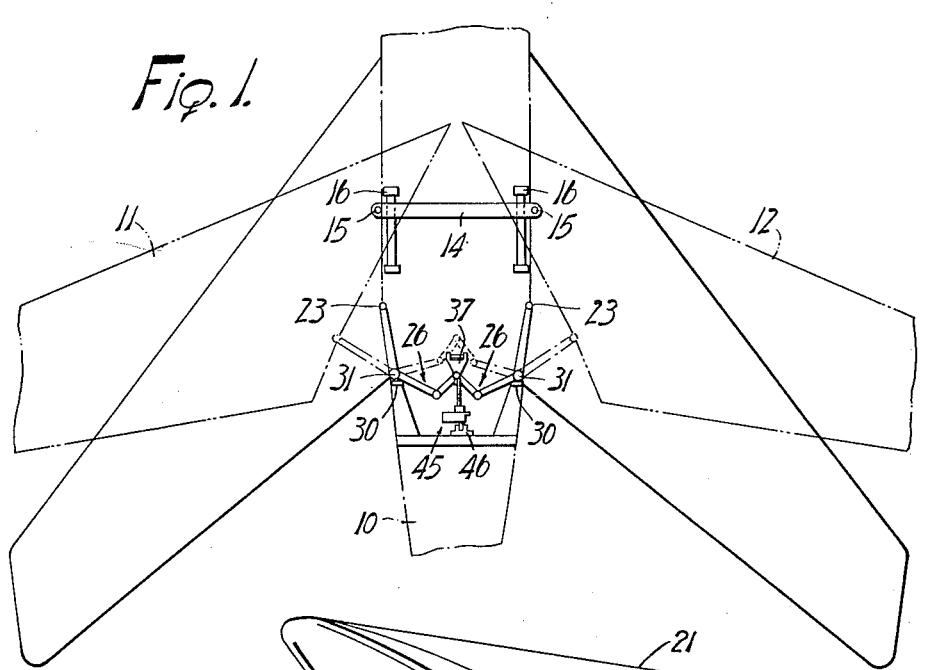
Fig. 1.
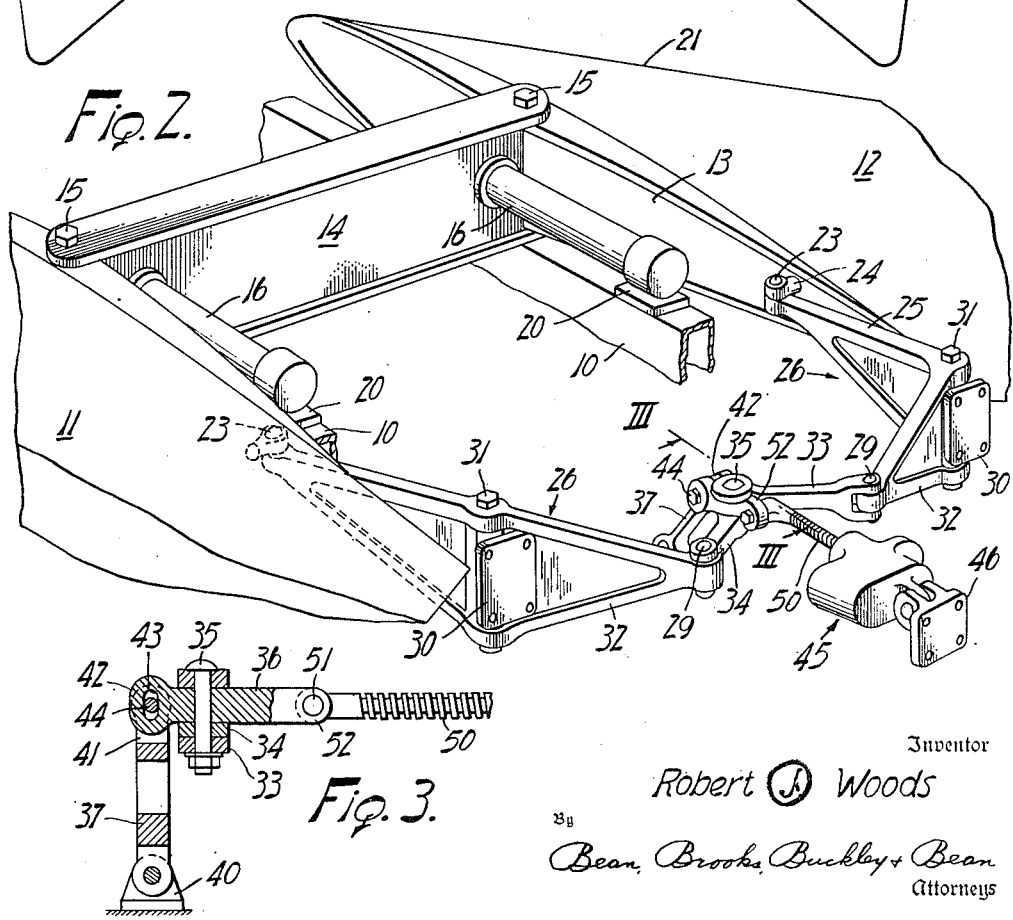
Fig. 2.
Fig. 3.
Inventor
Robert J. Woods
By
Bean, Brooks, Buckley & Bean
Attorneys

United States Patent Office 2,695,144
Patented Nov. 23, 1954

2,695,144

AIRPLANE

Robert J. Woods, Grand Island, N. Y., assignor to Bell Aircraft Corporation, Wheatfield, N. Y.

Application April 11, 1950, Serial No. 155,139

7 Claims. (Cl. 244—46)

My invention relates in general to airplanes and particularly to that type of airplane which is provided with pivotally mounted wings whereby the sweepback angle thereof may be varied during flight.

The principal object of my invention is to provide an improved airplane with pivotally mounted wings which will permit safe high speed performance with maximum wing sweepback, while permitting the use of the wings in their maximum wide spread or straight positions for low speed flight and for take-offs and landings.

Another object is to provide means for maintaining a substantially stationary center of pressure on the wings over the range of variable wing sweepback.

A further object is to provide a wing centering and stabilizing means for maintaining a uniform sweepback angle of the wings.

The above objects and advantages have been accomplished by the device shown in the accompanying drawings, of which:

Fig. 1 is a diagrammatic view showing a portion of the fuselage of the airplane equipped with my variable sweepback wings;

Fig. 2 is an isometrical perspective view of the mechanism for actuating the wings to their various sweepback angles; and Fig. 3 is an enlarged side elevation taken on line III—III of Fig. 2 showing the wing centering means.

My invention is illustrated in an airplane comprising a fuselage 10 having wings 11 and 12. The root end 13 of each of the wings is pivotally attached to a base member or carrythrough beam 14 by means of pivotal connections 15. The carrythrough beam 14 is slidably mounted upon spaced longitudinally extending tracks or slides 16 which are permanently fixed to the fuselage 10 by means of brackets 20, said beam as shown extending to opposite sides of the fuselage, and the pivotal connections 15 being shown located one at each end of the beam.

The pivot pins 15 connecting the carrythrough beam 14 with the wings are located toward the leading edges 21 of the wing structures, and located rearwardly of each pivot pin is a pivot pin 23 which is carried by a bracket 24 secured to the wing structure and to which the forward end 25 of a bellcrank 26 is pivotally secured. A bellcrank 26 is provided for each of the wings and is pivotally attached to a bellcrank bracket 30 which is carried by a stationary part of the fuselage. Each bellcrank is pivotally attached to the cooperating bracket by means of a pivot pin 31. The inner end 32 of each of the bellcranks is extended inwardly toward the center of the fuselage and each is provided with a pivot pin 29 for attachment to one of the toggle links 33 and 34. These links are connected together by means of a link pin 35 which passes through a stabilizer bracket 36. The link 33 is bifurcated and designed to extend over the stabilizer bracket 36 and the inner end of the toggle link 34, as clearly shown in Fig. 3.

So as to stabilize the movement of the bellcranks 26 and to actuate the wings uniformly about their pivot pins 15 when adjusting the sweepback angle, a centering scissors 37 is provided. This scissors is pivotally attached to a stationary bracket 40 secured to the fuselage, and its upper end 41 is bifurcated and extends upwardly on each side of a lug 42 carried by the stabilizer bracket. The bifurcated end of the centering scissors is formed with a slot 43 which has sliding movement with a pivot pin 44 passing therethrough. This slot compensates for the angular movement of the centering scissors when the stabilizer bracket is moved forwardly and backwardly in adjusting the sweepback angle of the wings.

Means are employed for actuating the stabilizer bracket, and such means preferably comprise a screwjack 45 which is pivotally attached to a screwjack bracket 46 secured to some stationary part of the fuselage. The screwjack is provided with a screw rod 50, the outer end of which is formed with an angular bracket 51 for pivotal attachment to the inner arm 52 of the stabilizer bracket 36.

As illustrated in Fig. 1, the wings 11 and 12 are shown in their maximum sweepback angle in full lines, and in their substantially straight line position in dot-and-dash lines. The wings are moved from one extreme position to the other through the medium of the screwjack 45 which is actuated preferably by suitable electric means. As the screwjack is actuated, the screw 50 thereof will be forced either outwardly in bringing the wings to their straight line position, or inwardly when adjusting the wings to their maximum sweepback positions. Obviously, such motion will be translated through the pivot pins 23 and the wing brackets 24 to the legs 25 of the bellcranks through the medium of the legs 32 of such bellcranks and the toggle links 33 and 34. As the wings are swept from one position to the other, the carrythrough beam will move upon the slides 16 and thereby substantially maintain a constant position of the center of pressure on the wing structure.

From the foregoing it will be clear that by means of my invention I may incorporate all the beneficial results of large sweep angles in high speed airplane conditions and still overcome the disadvantages of such sweepback by adjusting the wings to the essential straight line configuration in the take-off, climb, or other relatively low speed or cruising conditions of flight. The mechanism employed makes it possible to produce the variable sweepback of the wings without significant displacement of the mean aerodynamic center of the wings, thus providing a stationary center of pressure over the range of variable sweep-back. By means of my invention it is possible, therefore, during flight to alter the sweepback angle of the wings and to adjust them to any desired degree up to maximum so as to provide high speed conditions.

Obviously, some modifications of the details herein shown and described may be made without departing from the spirit of my invention or the scope of the appended claims, and I do not, therefore, wish to be limited to the exact embodiment herein shown and described.

What I claim is:

1. In an airplane, a fuselage, a base member mounted upon said fuselage for free movement longitudinally thereon, wings having their root ends pivotally connected to said base member at points located between the leading and trailing edges of said wings, a pair of bellcranks pivotally mounted diametrically opposite each other upon said fuselage and each having one leg pivotally attached to one of said wings at a point spaced longitudinally of said fuselage from the point of pivotal connection of the wing to said base member, and power means connected to the other legs of said bellcranks for simultaneously actuating the same to cause said wings to swing about their pivotal connections and simultaneously move said pivotal connections longitudinally of said fuselage.

2. In an airplane, a fuselage, a base member mounted upon said fuselage for free longitudinal movement thereon, wings having their root ends pivotally connected to said base member at points located between the leading and trailing edges of said wings, a pair of bellcranks pivotally mounted diametrically opposite each other upon said fuselage and each having one leg pivotally attached to one of said wings at a point located behind the point of pivotal connection of said wing to said base member, and power means connected to the other legs of said bellcranks for simultaneously actuating the same to cause said wings to swing about their pivotal connections and simultaneously move said pivotal connections longitudinally of said fuselage.

3. In an airplane, a fuselage, tracks carried by said fuselage and arranged parallel to the longitudinal axis of the fuselage, a carrythrough member slidably mounted upon said tracks, wings pivotally connected to said carrythrough member at points located between the leading and trailing edges of said wings, a pair of bellcranks pivotally mounted upon said fuselage and each having one leg pivotally attached to one of said wings at a point spaced longitudinally of said fuselage from the point of pivotal connection of the wing to said carrythrough member, and power means attached to the other legs of said bellcranks and operable to simultaneously actuate the same for causing said wings to swing about their pivotal connections and simultaneously move said pivotal connections with said carrythrough member longitudinally of said fuselage.

4. In an airplane, a fuselage, a base member mounted upon the fuselage for free sliding movement longitudinally thereof, wings having their root ends pivotally attached to said base member at points located between the leading and trailing edges of the wings, a pair of bellcranks pivotally mounted diametrically opposite each other upon the fuselage and each having one leg pivotally attached to one of said wings at a point spaced longitudinally from said point of pivotal attachment of the same to the base member, the inner end portion of each of the bellcranks extending inwardly toward the longitudinal center line of the fuselage, a pair of toggle links each connected at one end to the inner end of one of said bellcranks, said toggle links being pivotally connected with each other at their inner ends, and power means connected to the inner ends of said toggle links for actuating the bellcranks to cause said wings to swing about their pivotal points and move bodily longitudinally of the fuselage.

5. In an airplane, a fuselage, a base member mounted upon the fuselage for free sliding movement longitudinally thereof, wings having their root ends pivotally attached to said base member at points located between the leading and trailing edges of the wings, bellcranks pivotally mounted diametrically opposite each other upon the fuselage and each having one leg pivotally attached to one of said wings at a point spaced longitudinally from said point of pivotal attachment of the same to the base member, the inner end portion of each of the bellcranks extending inwardly toward the longitudinal center line of the fuselage, a pair of toggle links each connected at one end to the inner end of one of said bellcranks, said toggle links being pivotally connected with each other at their inner ends, and power means actuating the bellcranks to cause said wings to swing about their pivotal points and move bodily longitudinally of the fuselage, said means including a rod disposed longitudinally centrally of the points of pivotal connection of the bellcranks to the fuselage, said rod being pivotally connected at one end with the inner ends of said toggle links and being movable longitudinally.

6. The combination set forth in claim 4 together with centering means to stabilize the movement of said bell cranks and provide for uniform actuation of the wings about their pivotal points, said centering means including a lever pivotally connected at one end to the fuselage for longitudinal swinging movement and pivotally connected at its other end with the inner end portions of said toggle links.

7. The structure as recited in claim 4 and in which there is a pair of spaced longitudinally extending tracks on the fuselage, and said base member comprises a carrythrough beam slidably mounted on said tracks for longitudinal movement, said beam extending transversely to opposite sides of the fuselage, and said wings are pivotally connected one to each end of said carrythrough beam.

References Cited in the file of this patent

UNITED STATES PATENTS

| Number | Name | Date |
|---|---|---|
| 1,018,413 | Dunton | Feb. 27, 1912 |
| 1,112,885 | Battista | Oct. 6, 1914 |
| 1,366,895 | Abrahamson | Feb. 1, 1921 |
| 1,819,948 | Diago | Aug. 18, 1931 |
| 2,074,897 | Everts | Mar. 23, 1937 |